(No Model.)
J. M. STEBBINS.
GALVANIC BATTERY.
No. 250,596.        Patented Dec. 6, 1881.
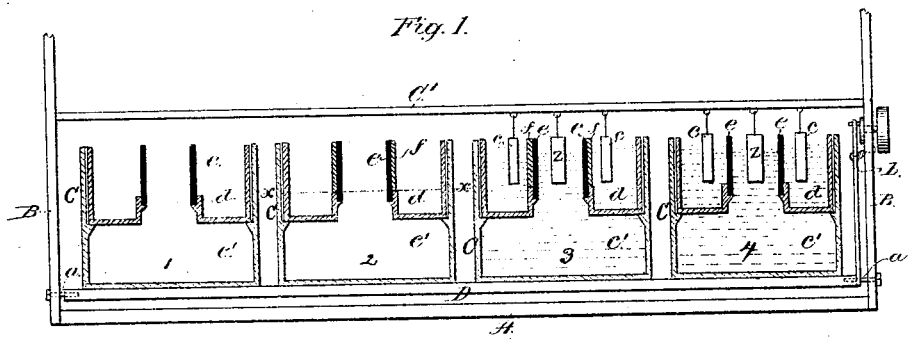
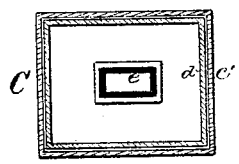
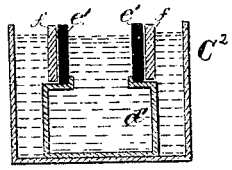
Witnesses.
John F. C. Preindler
James McKenzie
Inventor
Julius M. Stebbins

UNITED STATES PATENT OFFICE.

JULIUS M. STEBBINS, OF NEW YORK, N. Y.

GALVANIC BATTERY.

SPECIFICATION forming part of Letters Patent No. 250,596, dated December 6, 1881.

Application filed October 30, 1880. (No model.)

*To all whom it may concern:*

Be it known that I, JULIUS M. STEBBINS, a citizen of the United States, residing at New York, in the county of New York and State of New York, have invented certain new and useful Improvements in Galvanic Batteries; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to that class of galvanic or electric batteries in which porous cells or partitions are used to separate two liquids of different specific gravities.

The objects of my invention are to produce a battery combining great quantity and intensity with a long endurance, and to enable the force of the battery to be regulated at will. I attain these results, first, by constructing the inner cell with an upper comparatively contracted compartment inclosed by a porous wall and opening into a lower enlarged reservoir inclosed by a non-porous wall, arranging in the upper compartment a battery-plate of such form and dimensions that but a thin body of fluid can have place between its surfaces and the porous wall, and locating on opposite sides of said upper compartment two battery-plates of opposite character to the first, and in such close proximity to its porous walls that but a thin body of liquid will stand between them and said walls. When, now, the plates are so placed and the outer and inner cells properly filled with their respective fluids, these fluids being as usual of different specific gravities, the galvanic action between the plates commences, and the current from the positive plate or plates to the negative plate or plates, meeting with but little resistance from the thin bodies of fluid, as above described, will pass off from the negative over suitably-connected conductors with great intensity and quantity. The vigorous action resulting from the close proximity of the plates would soon exhaust the thin body of fluid in the inner cell; but as this inner cell connects with its enlarged lower non-porous reservoir, the fluid as exhausted is gradually replaced by a live or fresh portion, which arises from said reservoir. This replacement of exhausted by live fluid may result from two causes: first, if the liquid in the inner cell is of a less specific gravity than that in the outer cell, the endosmotic action which carries a portion of the outer liquid into the inner cell increases this specific gravity of that portion of the inner liquid which is in immediate contact with the sides of the inner plate, and it therefore falls gradually into the lower reservoir, from which a lighter and fresh supply rises to take its place and give place for it below where it is gradually diffused into the main body, though its heavier acquired portion settles to the bottom; again, if the inner fluid should have a greater specific gravity than the outer fluid, its tendency to crystallization would cause the upper portion to gradually fall during the galvanic action and force up a fresh portion in its place. In either case the rigorous action of the battery will continue until the entire contents of the reservoir are exhausted. The regulation of the force of the battery I accomplish by means of a non-porous sheath, with which I closely surround any desired extent of surface of the porous wall, so that only through so much of the same as desired the galvanic action can take place. I may also entirely stop the action of the battery by inclosing the entire porous wall of the inner compartment in said non-porous sheath.

In the accompanying drawings, Figure 1 is a sectional view of four batteries arranged upon an agitator. Fig. 2 is a horizontal section of one of the batteries or elements on the line $x\ x$, Fig. 1. Fig. 3 is a sectional view of a modification of the cells.

Referring to Figs. 1 and 2, the lower portions of the large cups C form the enlarged non-porous reservoirs, which are designated by $c'$, and the letter $e$ denotes the wall of the upper contracted compartment, said wall being porous and performing the function of the ordinary porous cup in two fluid electric batteries. This wall in the present instance is supported by a non-porous cup, $d$, which fills the upper portion of the large cup C, and through the bottom of which is an opening, affording communication between the porous cup and its lower non-porous reservoir. This construction simply is shown in the battery numbered 1 in Fig. 1.

In the battery numbered 2 the letter $f$ designates the non-porous sheath, heretofore referred to, which may be raised and lowered vertically to cover any desired extent of the porous wall $e$.

In the battery numbered 3 in Fig. 1 the fluids and plates are shown in place. In this instance the zinc plate Z is shown suspended in the inner cell, which, with its reservoir, is preferably filled with the usual dilute sulphuric acid, and the carbon plates $c$ are suspended in the outer cell, which is preferably filled with the ordinary solution of bichromate of potassium.

It will be observed that there is but a thin body of fluid on each side of the zinc—between it and the porous wall $e$—and there is also but a thin body of the outer fluid between each of the carbons $c$ and said porous wall, so that but little resistance is opposed to the galvanic action between the plates, and the reservoir $c'$ replaces by a fresh supply that portion of the inner fluid on opposite sides of the zinc as fast as it becomes exhausted or deteriorated.

In the battery numbered 4 in Fig. 1 the non-porous sheath of the porous cup is removed, while in the battery numbered 3 the sheath $f$ is shown as completely surrounding the porous cup.

The agitator upon which these batteries are mounted is composed of a base, A, from which rise standards B B, connected by a cross-bar, C', from which the battery-plates are suspended. The cups C rest on a rocking platform, D, pivoted at $a\ a$, and having an upwardly-projecting arm, $b$, which may be operated to rock the platform by any suitable mechanism. Of this agitator, however, no description is necessary here, as I propose to make it the subject of another application.

In the modification shown in Fig. 3 a non-porous reservoir, $d'$, rests on the bottom of the outer cells, $C^2$, and supports the smaller porous cup $e'$, and both the reservoir and the porous cup are surrounded by the outer fluid.

The letter $f$ denotes the sheath of the porous cup, as in the other figures. It may be made of hard rubber or similar material.

The action of a battery with this modification of cells is the same as that heretofore described.

Having now described my invention and explained the operation thereof, what I claim is—

1. A battery inner cell having a contracted upper portion inclosed by a porous wall, and an enlarged lower non-porous reservoir in communication with said upper portion, substantially as described.

2. In a galvanic or electric battery, the combination, with the outer cell and the inner cell composed of the enlarged lower reservoir and the upper contracted porous cup, having its bottom opening into said lower reservoir, of the battery-plates, arranged in close proximity to each other and to the walls of said porous cup, substantially as described.

3. The combination, with a battery porous cup, of an adjustable non-porous sheath, substantially as and for the purpose set forth.

In testimony whereof I affix my signature in presence of two witnesses.

JULIUS M. STEBBINS.

Witnesses:
S. WOLF,
EMANUEL BLOUT.